(12) United States Patent
Zhang et al.

(10) Patent No.: US 11,385,701 B2
(45) Date of Patent: Jul. 12, 2022

(54) POWER-ON PROCESSING METHOD AND APPARATUS OF TERMINAL DEVICE, AND TERMINAL DEVICE

(71) Applicant: SHENZHEN GOODIX TECHNOLOGY CO., LTD., Shenzhen (CN)

(72) Inventors: Ruisong Zhang, Shenzhen (CN); Xiaogang Qing, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 509 days.

(21) Appl. No.: 16/427,331

(22) Filed: May 30, 2019

(65) Prior Publication Data

US 2019/0294229 A1    Sep. 26, 2019

Related U.S. Application Data

(63) Continuation of application No. PCT/CN2018/079543, filed on Mar. 20, 2018.

(51) Int. Cl.
| | |
|---|---|
| *G06F 1/3231* | (2019.01) |
| *G06F 1/28* | (2006.01) |
| *G06F 9/4401* | (2018.01) |
| *G06V 10/98* | (2022.01) |
| *G06V 40/13* | (2022.01) |

(52) U.S. Cl.
CPC .............. *G06F 1/3231* (2013.01); *G06F 1/28* (2013.01); *G06F 9/4418* (2013.01); *G06V 10/98* (2022.01); *G06V 40/13* (2022.01)

(58) Field of Classification Search
CPC ........ G06F 9/4418; G06F 1/3231; G06F 1/30; G06F 1/26; G06F 1/28; G06F 1/263; G06F 1/3212
See application file for complete search history.

(56) References Cited

U.S. PATENT DOCUMENTS

| | | | |
|---|---|---|---|
| 7,463,756 B2* | 12/2008 | Benkley, III | ....... G06K 9/00026 345/174 |
| 9,230,150 B1 | 1/2016 | Merrell et al. | |

(Continued)

FOREIGN PATENT DOCUMENTS

| | | |
|---|---|---|
| CN | 104735529 A | 6/2015 |
| CN | 105787325 A | 7/2016 |

(Continued)

*Primary Examiner* — Raymond N Phan

(57) ABSTRACT

Provided are a power-on processing method and apparatus of a terminal device, and a terminal device, and the method includes: detecting whether a fingerprint input operation is performed on the fingerprint device, when the operating system of the terminal device is in a non-working state; controlling the fingerprint device to collect fingerprint data corresponding to the fingerprint input operation when it is detected that the fingerprint input operation is performed on the fingerprint device; detecting whether the fingerprint input operation triggers the power button, when it is detected that the fingerprint input operation is performed on the fingerprint device; and transmitting the fingerprint data collected by the fingerprint device to the operating system for security verification, when it is detected that the fingerprint input operation triggers the power button.

18 Claims, 2 Drawing Sheets

(56) References Cited

U.S. PATENT DOCUMENTS

| | | | |
|---|---|---|---|
| 9,898,642 B2* | 2/2018 | Han | G06F 21/31 |
| 2003/0142079 A1* | 7/2003 | Dunker | G06F 1/1616 |
| | | | 345/168 |
| 2009/0278807 A1* | 11/2009 | Hu | G06F 21/31 |
| | | | 345/173 |
| 2011/0125929 A1* | 5/2011 | James | G06F 3/011 |
| | | | 710/8 |
| 2012/0019356 A1* | 1/2012 | Gagneraud | G06F 1/1679 |
| | | | 340/5.32 |
| 2013/0263252 A1* | 10/2013 | Lien | G06F 1/3215 |
| | | | 726/19 |
| 2015/0199554 A1* | 7/2015 | Merrell | H04L 63/0861 |
| | | | 382/124 |
| 2015/0319294 A1* | 11/2015 | Sudhir | G06F 21/74 |
| | | | 455/411 |
| 2016/0086010 A1 | 3/2016 | Merrell et al. | |
| 2017/0116455 A1* | 4/2017 | Alameh | G06F 1/3262 |
| 2017/0147800 A1* | 5/2017 | Huang | G06F 21/32 |
| 2018/0069871 A1* | 3/2018 | Fasoli | G06F 21/84 |
| 2019/0212798 A1* | 7/2019 | Yang | G06F 1/1677 |

FOREIGN PATENT DOCUMENTS

| | | |
|---|---|---|
| CN | 105892889 A | 8/2016 |
| CN | 106570373 A | 4/2017 |
| CN | 106899762 A | 6/2017 |
| CN | 107223250 A | 9/2017 |

* cited by examiner

POWER-ON PROCESSING METHOD AND APPARATUS OF TERMINAL DEVICE, AND TERMINAL DEVICE

CROSS-REFERENCE TO RELATED APPLICATIONS

The present application is a continuation of international application No. PCT/CN2018/079543, filed on Mar. 20, 2018, which is hereby incorporated by reference in its entireties.

TECHNICAL FIELD

The present application relates to the technical field of electronics, and in particular, to a power-on processing method and apparatus of a terminal device, and a terminal device.

BACKGROUND

With the introduction of a fingerprint identification technology into an electronic terminal, fingerprint authentication has gradually replaced conventional password authentication, gesture authentication or the like, such that authentication merely requires a finger to come in contact with a fingerprint sensor without performing any other operations, which significantly improves convenience of use while ensuring security of the electronic terminal, thus making a fingerprint identification function a standard of the electronic terminal.

Taking the application of the fingerprint identification technology to a notebook computer as an example, a user presses a power button in a power-on process. After the startup of the notebook computer, a fingerprint login option appears on a login interface of an operating system, and the user may perform a fingerprint pressing operation on the fingerprint sensor again to unlock a screen or log in, and thus an entire power-on process of the terminal is completed.

For a conventional scenario where the fingerprint identification technology is used to unlock or log in the operating system, the user needs to perform at least two pressing operations (one for pressing the power button and one for pressing the fingerprint sensor) in the power-on process, thus affecting power-on efficiency of the terminal and causing poor user experience.

SUMMARY

In view of this, embodiments of the application provide a power-on processing method and apparatus of a terminal device, and a terminal device, which are beneficial for increasing the convenience of a user operation and could further improve user experience effectively.

In a first aspect, a power-on processing method of a terminal device is provided, where the terminal device includes a fingerprint device and a power button, the power button is configured to start an operating system of the terminal device, and the method includes: detecting whether a fingerprint input operation is performed on the fingerprint device, when the operating system of the terminal device is in a non-working state; controlling the fingerprint device to collect fingerprint data corresponding to the fingerprint input operation when it is detected that the fingerprint input operation is performed on the fingerprint device; detecting whether the fingerprint input operation triggers the power button, when it is detected that the fingerprint input opera- tion is performed on the fingerprint device; and transmitting the fingerprint data collected by the fingerprint device to the operating system for security verification, when it is detected that the fingerprint input operation triggers the power button.

Optionally, the non-working state may be a sleep state, a hibernation state or a shutdown state. The operating system is in the non-working state, which may be specifically that a central processing unit (CPU) of the terminal device does not work.

In a power-on process of the terminal device, the operating system of the terminal device may be accessed by the user performing the fingerprint input operation only once, which is beneficial for increasing the convenience of the user operation and could further improve the user experience effectively.

In a possible implementation manner, the method further includes: starting a first timer when the fingerprint device has collected the fingerprint data corresponding to the fingerprint input operation; detecting that a new fingerprint input operation is performed before the first timer expires; and controlling the fingerprint device to collect fingerprint data corresponding to the new fingerprint input operation; where the transmitting the fingerprint data collected by the fingerprint device to the operating system, when it is detected that the fingerprint input operation triggers the power button includes: transmitting a latest fingerprint data collected by the fingerprint device to the operating system, when it is detected that the fingerprint input operation triggers the power button and the first timer expires.

In a possible implementation manner, the method further includes: deleting the fingerprint data corresponding to the fingerprint input operation collected by the fingerprint device, when it is detected that the fingerprint input operation does not trigger the power button.

In a possible implementation manner, the detecting whether the fingerprint input operation triggers the power button, when it is detected that the fingerprint input operation is performed on the fingerprint device includes: starting a second timer when the fingerprint device has collected the fingerprint data corresponding to the fingerprint input operation; and detecting whether the operating system has been started under the trigger of the fingerprint input operation, when the second timer expires.

Optionally, the first timer and the second timer may be the same timer.

In a possible implementation manner, the detecting whether the operating system has been started under the trigger of the fingerprint input operation, when the second timer expires includes: detecting an embedded controller (EC) power state of the terminal device, when the second timer expires; and where if the EC power state is a power-on state, the operating system has been started under the trigger of the fingerprint input operation; or if the EC power state is a power-down state, the operating system has not been started under the trigger of the fingerprint input operation.

In a possible implementation manner, the transmitting the fingerprint data collected by the fingerprint device to the operating system includes: transmitting the fingerprint data collected by the fingerprint device to the operating system, when a fingerprint data verification request is received from the operating system.

In a possible implementation manner, the method further includes: starting a third timer when it is detected that the operating system has been started under the trigger of the fingerprint input operation; and deleting the fingerprint data corresponding to the fingerprint input operation collected by the fingerprint device, when the fingerprint data verification request is not received before the third timer expires.

In a possible implementation manner, the method further includes: an operating mode of the fingerprint device is a low power consumption detection mode, when the operating system is in the non-working state and it is not detected that the fingerprint input operation is performed on the fingerprint device.

In a possible implementation manner, before the detecting whether the fingerprint input operation is performed on the fingerprint device, the method further includes: setting the fingerprint device in the low power consumption detection mode, when it is detected that an embedded controller (EC) power state is a power-down state.

In a possible implementation manner, before the detecting whether the fingerprint input operation is performed on the fingerprint device, the method further includes: setting the fingerprint device in the low power consumption detection mode according to a command issued by the operating system, when the operating system is about to enter the non-working state.

In a possible implementation manner, a microcontroller unit (MCU) of the terminal device is in a sleep state, when the operating system of the terminal device is in the non-working state and it is not detected that the fingerprint input operation is performed on the fingerprint device.

In a possible implementation manner, the method further includes: prompting a user to perform a fingerprint input operation again, when the operating system verifies the fingerprint data collected by the fingerprint device unsuccessfully.

In a second aspect, provided is a power-on processing apparatus of a terminal device for executing the method in the first aspect or any possible implementations of the first aspect. In particular, the apparatus may include a unit for executing the method in the first aspect or any possible implementations of the first aspect.

In a third aspect, provided is a terminal device including a memory for storing a computer program, a processor for calling and executing a computer program from the memory, a power button and a fingerprint device; and when the program is executed, the processor executes the method in the first aspect or any possible implementations of the first aspect.

In a fourth aspect, provided is a computer readable medium for storing a computer program including an instruction for executing the method in the first aspect or any possible implementations of the first aspect.

In a fifth aspect, provided is a computer program product including an instruction which, when executed on a computer, causes the computer to execute the method in the first aspect or any of the alternative implementations of the first aspect.

These and other aspects of the present application will be more clearly understood in the following description of the embodiments.

DESCRIPTION OF EMBODIMENTS

A clear and complete description of technical solutions provided in embodiments of the present application will be given below in conjunction with the accompanying drawings in the embodiments of the present application.

With the introduction of a fingerprint identification technology into an electronic terminal, fingerprint authentication has gradually replaced conventional password authentication, gesture authentication or the like, such that authentication merely requires a finger to come in contact with a fingerprint sensor without performing any other operations, which significantly improves convenience of use while ensuring security of the electronic terminal, thus making a fingerprint identification function a standard of the electronic terminal.

As a common application scenario, the power-on processing method of the terminal device according to the embodiment of the present application can be applied to a smart phone, a tablet computer, a notebook computer, a desktop computer, other mobile terminals with a power button and a fingerprint device, or other terminal devices. In the foregoing terminal device, the fingerprint device may be specifically an optical fingerprint device, an ultrasonic fingerprint device or other types of the fingerprint device. More specifically, setting of a position of the fingerprint device and the power button on the terminal device may achieve a function of triggering the power button to start an operating system of the terminal device while performing a fingerprint pressing operation on the fingerprint device. For example, the fingerprint device is directly attached to the power button or is mounted on the power button in other forms, so that the user may complete power-on and login of the terminal device by pressing the power button with a registered finger once, rather than pressing the power button and the fingerprint device respectively.

Figure 1:
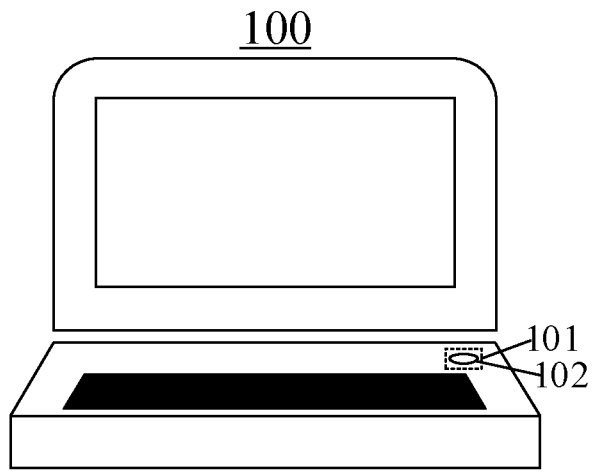
FIG. 1 shows a schematic block diagram of an application scenario of an embodiment of the present application.

For ease of understanding, the following is a schematic structural diagram of a terminal device of an embodiment of the present application by taking a notebook computer as an example. As shown in FIG. 1, a terminal device 100 includes a fingerprint device 101 and a power button 102. Specifically, the fingerprint device 101 and the power button 102 may be disposed at the same position of the terminal device 100 as shown in FIG. 1, for example, at an upper right corner of a main board of the terminal device 100. The fingerprint device 101 may be fixedly disposed on the power button 102 in an attaching manner or in other manners.

Figure 2:
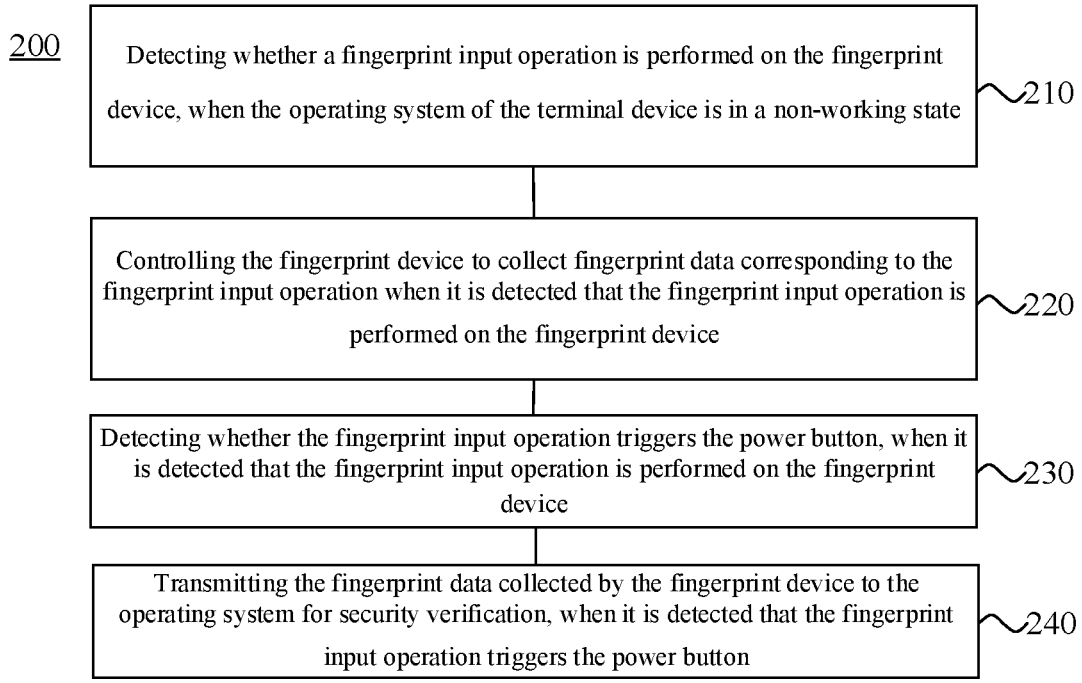
FIG. 2 shows a schematic block diagram of a power-on processing method of a terminal device according to an embodiment of the present application.

FIG. 2 shows a schematic flowchart diagram of a power-on processing method 200 of a terminal device according to an embodiment of the present application. As shown in FIG. 2, the method may be executed by a terminal device, for example, a microcontroller unit (MCU) in the terminal device, and the terminal device may adopt a structure shown in FIG. 1, that is, the terminal device includes a power button and a fingerprint device attached on the power button, and the power button is configured to start the operating system of the terminal device. Alternatively, the power button and the fingerprint device may be disposed at the same position of the terminal device by adopting other manners. Specifically, the method 200 may include some or all of the following steps:

S210, detecting whether a fingerprint input operation is performed on the fingerprint device, when the operating system of the terminal device is in a non-working state;

S220, controlling the fingerprint device to collect fingerprint data corresponding to the fingerprint input operation when it is detected that the fingerprint input operation is performed on the fingerprint device;

S230, detecting whether the fingerprint input operation triggers the power button, when it is detected that the fingerprint input operation is performed on the fingerprint device; and S240, transmitting the fingerprint data collected by the fingerprint device to the operating system for security verification, when it is detected that the fingerprint input operation triggers the power button.

Specifically, when the operating system of the terminal device is in a non-working state (including but not limited to a sleep state, a hibernation state or a shutdown state), the terminal device may detect whether a fingerprint input operation is performed on the fingerprint device, for example, the fingerprint device of the terminal device detects whether a fingerprint input operation is performed. In this case, a central processing unit (CPU) of the operating system does not work, the terminal device may continuously detect whether a fingerprint input operation is performed on the fingerprint device; if it is detected that a fingerprint input operation is performed on the fingerprint device, the terminal device controls the fingerprint device to collect fingerprint data corresponding to the fingerprint input operation; for example, if the fingerprint device detects that a fingerprint input operation is performed, the fingerprint device may wake up or inform the MCU of the terminal device, so that the MCU controls the fingerprint device to collect the fingerprint data, and the terminal device may also detect whether the fingerprint input operation triggers the power button. Once it is detected that the fingerprint input operation has triggered the power button and before a login interface of the terminal device is accessed, the operating system may acquire, from the MCU through a fingerprint driving module of the terminal device, the fingerprint data corresponding to the fingerprint input operation detected by the fingerprint device. It should be understood that when the terminal device detects that a fingerprint input operation is performed, the terminal device may first control the fingerprint device to collect fingerprint data and then detect whether the power button is triggered, or may first detect whether the power button is triggered and then control the fingerprint device to collect fingerprint data, or may also control the fingerprint device to collect fingerprint data while detecting whether the power button is triggered. For example, after the fingerprint device has collected the fingerprint data, the fingerprint data may be stored in the MCU, and the MCU may wait for the operating system to call the fingerprint data through the fingerprint driving module, and then the operating system may perform fingerprint match, that is, data legitimacy authentication. The data legitimacy authentication is authentication of login authority if it is applied to the notebook computer, that is, whether a user who inputs the fingerprint data has legal authority to log in and use the notebook computer is determined.

Therefore, according to the power-on processing method of the terminal device according to the embodiment of the present application, in the power-on process of the terminal device, the operating system of the terminal device may be accessed by the user performing the fingerprint input operation only once, which is beneficial for increasing the convenience of the user operation and could further improve the user experience effectively.

Alternatively, the fingerprint device in the embodiment of the present application may also be other biometric identification devices, for example, the biometric identification device may be a palm print identification device that may collect palm print data. In a specific implementation, the power button of the terminal device can be triggered in the process of collecting biometric data by the biometric identification device, which is not limited by the embodiment of the present application.

Optionally, in the embodiment of the application, the method further includes: starting a first timer when the fingerprint device has collected the fingerprint data corresponding to the fingerprint input operation; detecting that a new fingerprint input operation is performed before the first timer expires; and controlling the fingerprint device to collect fingerprint data corresponding to the new fingerprint input operation; where the transmitting the fingerprint data collected by the fingerprint device to the operating system, when it is detected that the fingerprint input operation triggers the power button includes: transmitting the latest fingerprint data collected by the fingerprint device to the operating system, when it is detected that the old fingerprint input operation triggers the power button and the first timer expires.

It should be understood that it usually takes a certain period of time from the power button being triggered to the operating system being started, and within this period of time (that is, within a time length of the first timer in the embodiment of this application, where the time length of the first timer may be slightly longer than this period of time), if a new fingerprint input operation is detected on the fingerprint device, that is, the fingerprint device has collected a new fingerprint data, the latest fingerprint data collected by the fingerprint device needs to be transmitted to the operating system. For example, the terminal device detects that a fingerprint input operation is performed at a first time, controls the fingerprint device to collect fingerprint data corresponding to the fingerprint input operation at the first time; and the terminal device detects that the fingerprint input operation at the first time triggers the power button, and also detects a fingerprint input operation at a second time after the first time, and controls the fingerprint device to collect fingerprint data corresponding to the fingerprint input operation at the second time. If the operating system has not been started before the second time, that is, the first timer has not expired, after the operating system is started, the fingerprint data corresponding to the fingerprint input operation collected by the fingerprint device at the second time may be transmitted to the operating system.

It should be understood that before the first timer expires, if the terminal device repeatedly detects that a plurality of fingerprint input operations, the fingerprint data collected by the fingerprint device shall keep the fingerprint data corresponding to the last fingerprint input operation. In other words, when the terminal device detects that the fingerprint input operation triggers the power button for the first time and the first timer expires, the latest fingerprint data collected by the fingerprint device is transmitted to the operating system.

For example, if the fingerprint input operation triggering the power button is a fingerprint pressing operation by a registered finger, the fingerprint input operation is detected again after the fingerprint pressing operation by the registered finger is detected and before the operating system is accessed; if the fingerprint input operation detected again is a fingerprint input operation by a non-registered finger, the fingerprint data acquired by the operating system corresponds to the fingerprint input operation by the non-registered finger after the operating system is started; and at this time, the login fails after the operating system performs a match operation.

For another example, if the fingerprint input operation triggering the power button is a fingerprint pressing operation by a non-registered finger, the fingerprint input operation is detected again after the fingerprint pressing operation by the non-registered finger is detected and before the operating system is accessed; if the fingerprint input operation detected again is a fingerprint input operation by a registered finger, the fingerprint data acquired by the operating system corresponds to the fingerprint input operation by the registered finger after the operating system is started; and at this time, the login succeeds after the operating system performs a match operation.

In the embodiment of the present application, as long as the fingerprint input operation triggering the power button and the fingerprint input operation corresponding to the fingerprint data for fingerprint match obtained by the operating system are not the same fingerprint input operation, it can be understood that a one-press power-on operation of the terminal device fails.

Optionally, in the embodiment of the present application, the method further includes: deleting the fingerprint data corresponding to the fingerprint input operation collected by the fingerprint device, when it is detected that the fingerprint input operation does not trigger the power button.

Specifically, the two successive fingerprint input operations exceeding the time length of the first timer is taken as an example, when the operating system of the terminal device is in a non-working state, the terminal device may detect in real time whether each fingerprint input operation triggers the power button. When the terminal device detects that a certain fingerprint input operation triggers the power button, it needs to wait until after the operating system is started to call the fingerprint data corresponding to the fingerprint input operation collected by the fingerprint device through the fingerprint driving module; and if the terminal device does not detect that the fingerprint input operation triggers the power button, the fingerprint data corresponding to the fingerprint input operation collected by the fingerprint device may be directly deleted, that is, the terminal device may detect whether a fingerprint input operation is performed on the fingerprint device again to collect new fingerprint data. Therefore, it can be avoided that once the operating system is started in other ways, the security verification is directly completed to access the operating system, which may damage security of the operating system.

Optionally, in the embodiment of the present application, the detecting whether the fingerprint input operation triggers the power button, when it is detected that the fingerprint input operation is performed on the fingerprint device includes: starting a second timer when the fingerprint device has collected the fingerprint data corresponding to the fingerprint input operation; and detecting whether the operating system has been started under the trigger of the fingerprint input operation, when the second timer expires.

Similarly, the two successive fingerprint input operations exceeding the time length of the first timer is taken as an example, when the terminal device has collected fingerprint data corresponding to a certain fingerprint input operation, the terminal device may simultaneously start the second timer. Similarly, a time length of the second timer may be determined according to a time interval between the trigger of the power button and the access to the operating system. After the second timer expires, the terminal device may detect whether the operating system has been started under the trigger of this fingerprint input operation.

In an implementation, the first timer and the second timer may be the same timer. In other words, when the terminal device detects that the fingerprint device has collected the fingerprint data corresponding to a certain fingerprint input operation, a timer may be started; if the terminal device detects a new fingerprint input operation within a time length of the timer, after the timer expires, the terminal device may detect whether the operating system has been started; and if it is detected that the operating system has been started, the fingerprint data acquired by the operating system through the fingerprint driving module is the latest fingerprint data collected by the fingerprint device. If the terminal device does not detect a new fingerprint input operation within a time length of the timer, the terminal device may detect whether the operating system has been started after the timer expires, and if it is detected that the operating system has been started, the fingerprint data acquired by the operating system through the fingerprint driving module is the fingerprint data corresponding to the fingerprint input operation triggering the power button.

Optionally, the terminal device may also determine whether the fingerprint input operation triggers the power button by detecting whether the power button is pressed, and there is no need to determine whether the fingerprint input operation triggers the power button after the timer expires.

Specifically, the detecting whether the operating system has been started under the trigger of the fingerprint input operation, when the second timer expires includes: detecting an embedded controller (EC) power state of the terminal device, when the second timer expires; and where if the EC power state is a power-on state, the operating system has been started under the trigger of the fingerprint input operation; or if the EC power state is a power-down state, the operating system has not been started under the trigger of the fingerprint input operation.

Typically, the terminal device may also include an EC, which may be a separate processor that manages the entire operating system at startup and in a power-on process. The MCU may obtain the EC power state, and the operating system may inform the MCU about the EC power state corresponding to a state of the operating system through the connection to the MCU, for example, the MCU may be informed through GPIO. If the operating system is in a sleep state, a hibernation state or a shutdown state, its corresponding EC power state may be a power-down state, and if the operating system is in a working state, its corresponding EC power state may be a power-on state. The MCU may obtain the EC power state from the operating system, and the MCU may determine whether the operating system of the terminal device has been started according to whether the EC power state is the power-down state or the power-on state.

Alternatively, when the MCU cannot know the EC power state corresponding to the state of the operating system, the MCU may also determine whether the operating system has been started through whether communication has been established with the fingerprint driving module. For example, if the MCU has received a fingerprint data verification request transmitted by the operating system through the fingerprint driving module within a predetermined time, it is considered that the operating system has been started. If the MCU does not receive the fingerprint data verification request transmitted by the operating system through the fingerprint driving module within the predetermined time, it is not considered that the operating system has been started temporarily.

Optionally, in the embodiment of the present application, the transmitting the fingerprint data collected by the fingerprint device to the operating system includes: transmitting the fingerprint data collected by the fingerprint device to the operating system, when a fingerprint data verification request is received from the operating system.

The MCU may submit the fingerprint data collected by the fingerprint device to the operating system according to the fingerprint data verification request issued by the operating system. In other words, presence of the fingerprint data verification request triggers the submission of the fingerprint data. Specifically, after the fingerprint device has collected the fingerprint data, the fingerprint data may be transmitted to the MCU for storage, and once the fingerprint data verification request is received, the MCU transmits the stored fingerprint data to the operating system through the fingerprint driving module, so that the operating system, such as the CPU in the operating system, performs fingerprint match on the fingerprint data, and once the match is successful, the operating system may be accessed.

In another alternative embodiment, once it is determined that the operating system has been started, the MCU may directly submit the fingerprint data collected by the fingerprint device to the operating system through the fingerprint driving module.

Optionally, in the embodiment of the present application, the method further includes: starting a third timer when it is detected that the operating system has been started under the trigger of the fingerprint input operation; and deleting the fingerprint data corresponding to the fingerprint input operation collected by the fingerprint device, when the fingerprint data verification request is not received before the third timer expires.

It should be understood that once the operating system accesses a login interface, it may be considered that the one-press power-on operation of the terminal device fails. It takes a certain time from the startup of the operating system to the operating system access to the login interface, if the operating system has not called the fingerprint data collected by the fingerprint device and stored in the MCU within this period of time, that is, if the MCU does not receive the fingerprint data verification request transmitted by the operating system through the fingerprint driving module within this period of time, it can be considered that the one-press power-on operation fails this time. In this case, the operating system has accessed the login interface, a user is required to perform a fingerprint input operation again for fingerprint match. MCU may delete the last fingerprint data collected by the fingerprint device. In this way, it can be avoided that once the operating system is started in other ways, the security verification is directly completed to access the operating system, which may damage the security of the operating system.

Optionally, an operating mode of the fingerprint device is a low power consumption detection mode and/or the microcontroller unit (MCU) of the terminal device is in a sleep state, when the operating system is in the non-working state and it is not detected that the fingerprint input operation is performed on the fingerprint device.

Generally, when the operating system enters a non-working state, the MCU is in a power-off state and the fingerprint device also does not work, that is, when the user performs the fingerprint pressing operation on the fingerprint device, the fingerprint device does not collect the fingerprint data. In this case, the terminal device does not have a one-press power-on function. In an embodiment of the present application, when the operating system is in a non-working state, the fingerprint device may be configured in a detection mode, that is, the fingerprint device may be in a working state. In this way, the fingerprint device may detect and collect the fingerprint data in real time. Further, once the user performs the fingerprint pressing operation, the power button is triggered to start the operating system while the fingerprint device is controlled to collect the fingerprint data, so that the one-press power-on operation can be achieved. Preferably, when the operating system is in the non-working state and it is not detected that the fingerprint operation is performed, the fingerprint device may enter a low power consumption detection mode to meet a requirement of reducing power consumption. Similarly, when the operating system is in the non-working state and it is not detected that the fingerprint operation is performed, the MCU may also be in a sleep mode. In this way, once a fingerprint input operation is performed on the fingerprint device, the fingerprint device may wake up the MCU quickly, and then the MCU may configure the fingerprint device to enter a normal detection mode, that is, a mode of collecting the fingerprint data.

As an optional embodiment, there may be a general purpose input output (GPIO) between the MCU and the operating system, and the GPIO may be configured as an interrupted source and a wake-up source. If the MCU is in a working state, once the operating system enters a sleep state, a hibernation state or a shutdown state, the operating system may inform the MCU about the EC power state corresponding to the state of the operating system in an interrupted manner through the GPIO connected to the MCU, so that the MCU configures the fingerprint device in a detection mode, which may be a low power consumption detection mode or a normal detection mode. If the MCU is in a sleep state, once the operating system enters a sleep state, a hibernation state or a shutdown state, the operating system may inform the MCU about the EC power state corresponding to the operating system in a wake-up manner through the GPIO connected to the MCU, so that the MCU configures the fingerprint device in the detection mode, which may be the low power consumption detection mode or the normal detection mode.

As another optional embodiment, the MCU does not have the GPIO configured as an interrupted source and a wake-up source, when the operating system is about to enter a sleep state, a hibernation state or a shutdown state, the operating system may acquire the EC power state corresponding to the state to be accessed by the operating system, and transmit the EC power state to the MCU through the fingerprint driving module, so that the MCU configures the fingerprint device in the detection mode, which may be the low power consumption detection mode or the normal detection mode. The MCU may be informed of the EC power state to configure the fingerprint device through other forms, or the MCU is informed to configure the fingerprint device through other forms if the EC power state is not available. The embodiment of the present application is not limited thereto.

Optionally, after the operating system enters a sleep state, a hibernation state or a shutdown state, the MCU may also be powered off to be in a state where no power consumption occurs. The behavior of touching the power button, and triggering the operating system to be started may be an operation of controlling immediate startup of a power supply system by the EC to supply power to the MCU and the fingerprint device. Power is supplied to the fingerprint device immediately, then the fingerprint device may be controlled to collect fingerprint data immediately after the MCU is started, and thus power consumption can be reduced to the greatest extent.

Optionally, in the embodiment of the present application, the method further includes: prompting a user to perform a fingerprint input operation again, when the operating system verifies the fingerprint data collected by the fingerprint device unsuccessfully.

In practical applications, when the operating system verifies the fingerprint data collected by the fingerprint device unsuccessfully, different manufacturers may use different interaction modes, such as directly prompting the user to perform a fingerprint input operation again through text, or prompting the user to perform a fingerprint input operation again through vibration feedback, such as vibrating twice (generally vibrating twice indicates failure), or without any feedback.

Optionally, in the embodiment of the present application, the MCU may communicate with the fingerprint device through a serial peripheral interface (SPI), that is, the MCU may acquire the fingerprint data from the fingerprint device through an SPI bus. The CPU may communicate with the MCU through the SPI or a universal serial bus (Universal Serial Bus, USB). For example, the CPU may transmit a fingerprint data verification request to the MCU through the SPI or USB and obtain the fingerprint data from the MCU through the SPI or USB. The CPU may also transmit the EC power state to the MCU through GPIO. It should be understood that the embodiment of the present application does not limit the communication manner between the MCU and the fingerprint device and the communication manner between the CPU and the MCU.

In the power-on processing method of the terminal device according to the embodiment of the present application, when the operating system is in a sleep state, a hibernation state or a shutdown state, the fingerprint device is configured in a detection mode, so that the fingerprint device may collect the fingerprint data while the power button is triggered by the fingerprint input operation of the user, and thus in the power-on process of the terminal device, the operating system of the terminal device may be accessed by the user performing the fingerprint input operation only once, which is beneficial for increasing the convenience of the user operation and could further improve the user experience effectively.

It should also be understood that, the serial numbers of the foregoing processes do not mean the execution order, the execution order of the processes should be determined by the functions and internal logics thereof, and should not constitute any limit to the implementing processes of the embodiments of the present application.

Although the present application and its advantages have been described in detail, it should be understood that various changes, substitutions and alterations can be made to the present application without departing from the spirit and scope of the present application as defined by the appended claims.

Figure 3:
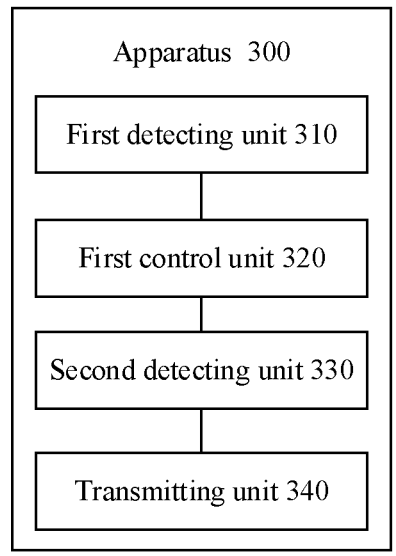
FIG. 3 shows a schematic block diagram of a power-on processing apparatus of a terminal device according to an embodiment of the present application.

FIG. 3 shows a schematic block diagram of a power-on processing apparatus 300 of a terminal device according to an embodiment of the present application. The terminal device includes a fingerprint device and a power button, the power button is configured to start an operating system of the terminal device, and as shown in FIG. 3, the apparatus 300 includes:

a first detecting unit 310, configured to detect whether a fingerprint input operation is performed on the fingerprint device, when the operating system of the terminal device is in a non-working state;

a first control unit 320, configured to control the fingerprint device to collect fingerprint data corresponding to the fingerprint input operation when the first detecting unit detects that the fingerprint input operation is performed on the fingerprint device;

a second detecting unit 330, configured to detect whether the fingerprint input operation triggers the power button, when the first detecting unit detects that the fingerprint input operation is performed on the fingerprint device; and a transmitting unit 340, configured to transmit the fingerprint data collected by the fingerprint device to the operating system for security verification, when the second detecting unit detects that the fingerprint input operation triggers the power button.

Therefore, in the power-on processing apparatus of the terminal device according to the embodiment of the present application, in the power-on process of the terminal device, the operating system of the terminal device may be accessed by the user performing the fingerprint input operation only once, which is beneficial for increasing the convenience of the user operation and could further improve the user experience effectively.

Optionally, in the embodiment of the present application, the apparatus further includes: a first timing unit, configured to start a first timer when the fingerprint device has collected the fingerprint data corresponding to the fingerprint input operation; where the first detecting unit is further configured to detect that a new fingerprint input operation is performed before the first timer expires; and the transmitting unit is configured to: transmit the latest fingerprint data collected by the fingerprint device to the operating system, when the second detecting unit detects that the fingerprint input operation triggers the power button and the first timer expires.

Optionally, in the embodiment of the present application, the apparatus further includes: a first deleting unit, configured to delete the fingerprint data corresponding to the fingerprint input operation collected by the fingerprint device, when it is detected that the fingerprint input operation does not trigger the power button.

Optionally, in the embodiment of the present application, the second detecting unit is configured to: start a second timer when the fingerprint device has collected the fingerprint data corresponding to the fingerprint input operation; and detect whether the operating system has been started under the trigger of the fingerprint input operation, when the second timer expires.

Optionally, in the embodiment of the present application, that the second detecting unit detects whether the operating system has been started under the trigger of the fingerprint input operation, when the second timer expires includes: detecting an embedded controller EC power state of the terminal device, when the second timer expires; where if the EC power state is a power-on state, the operating system has been started under the trigger of the fingerprint input operation; or if the EC power state is a power-down state, the operating system has not been started under the trigger of the fingerprint input operation.

Optionally, in the embodiment of the present application, the transmitting unit is configured to transmit the fingerprint data corresponding to the fingerprint input operation collected by the fingerprint device to the operating system, when a fingerprint data verification request is received from the operating system.

Optionally, in the embodiment of the present application, the apparatus further includes: a second timing unit, configured to start a third timer when it is detected that the fingerprint input operation triggers the power button to start the operating system; and a second deleting unit, configured to delete the fingerprint data of the fingerprint input operation collected by the fingerprint device, when the fingerprint data verification request is not received before the third timer expires.

Optionally, in the embodiment of the present application, an operating mode of the fingerprint device is a low power consumption detection mode, when the operating system is in the non-working state and it is not detected that the fingerprint input operation is performed on the fingerprint device.

Optionally, in the embodiment of the present application, the apparatus further includes: a configuration unit, configured to set the fingerprint device in the low power consumption detection mode, when it is detected that an embedded controller (EC) power state is a power-down state and before whether the fingerprint input operation is performed on the fingerprint device is detected.

Optionally, in the embodiment of the present application, the apparatus further includes: a configuration unit, configured to set the fingerprint device in the low power consumption detection mode according to a command issued by the operating system, when the operating system is about to enter the non-working state and before whether the fingerprint input operation is performed on the fingerprint device is detected.

Optionally, in the embodiment of the present application, a microcontroller unit MCU of the terminal device is in a sleep state, when the operating system is in the non-working state and it is not detected that the fingerprint input operation is performed on the fingerprint device.

Optionally, in the embodiment of the present application, the apparatus further includes: a prompting unit, configured to prompt a user to perform a fingerprint input operation again, when the operating system verifies the fingerprint data collected by the fingerprint device unsuccessfully.

Optionally, in the embodiment of the present application, the non-working state includes a sleep state, a hibernation state or a shutdown state.

The power-on processing apparatus 300 of the terminal device according to the embodiment of the present application may correspond to an execution body in the embodiment of the method of the present application, and the foregoing and other operations and/or functions of each unit in the apparatus 300 are respectively used for achieving the corresponding flow of the method 200 shown in FIG. 2, which will not be repeatedly described herein for brevity.

An embodiment of the present application further provides a terminal device, which includes the power-on processing apparatus, a fingerprint device and a power button; and further the power-on processing apparatus corresponds to the power-on processing apparatus 300 of the terminal device provided by the embodiment of the present application. Specifically, the fingerprint device of the terminal device may be mounted on the power button of the terminal device.

Figure 4:
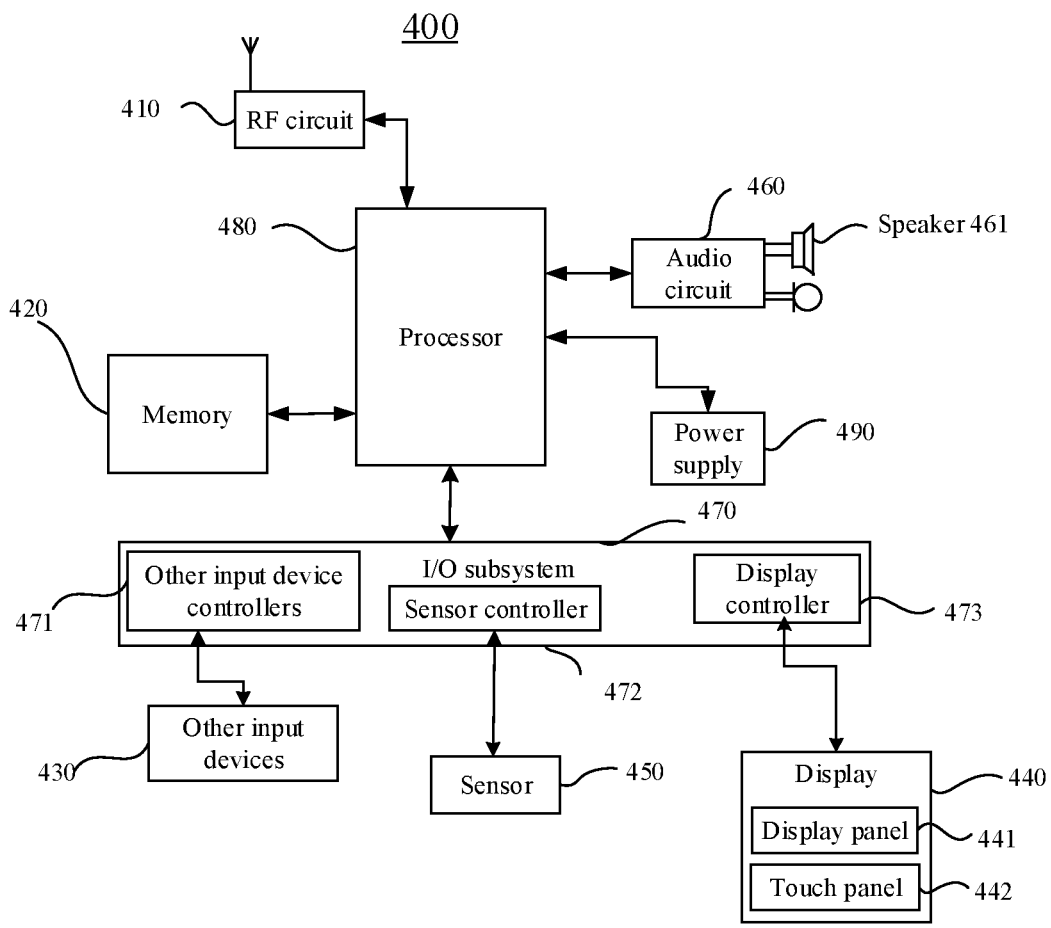
FIG. 4 shows a schematic block diagram of a terminal device according to an embodiment of the present application.

FIG. 4 is a schematic block diagram of a terminal device 400 according to an embodiment of the present application. The terminal device 400 shown in FIG. 4 includes a radio frequency (RF) circuit 410, a memory 420, other input devices 430, a display 440, a sensor 450, an audio circuit 460, an I/O subsystem 470, a processor 480, a power supply 490, and other components. Persons of ordinary skill may understand that the structure of the terminal device shown in FIG. 4 does not constitute a limitation to the terminal device, and may include more or fewer components than those illustrated, or combine some components, split some components, or use different component arrangements. Persons of ordinary skill may understand that the display 440 belongs to a user interface (UI), and the terminal device 400 may include the user interface that has fewer components than that illustrated.

Each of the components of the terminal device 400 will be specifically described below with reference to FIG. 4.

The RF circuit 410 may be configured to transmit and receive a signal in a process of receiving and transmitting information or calling, in particular, after downlink information from a base station is received, it is provided to the processor 480 for processing; in addition, the relating uplink data is transmitted to the base station. Generally, the RF circuit includes, but is not limited to, an antenna, at least one amplifier, a transceiver, a coupler, a low noise amplifier (LNA), a duplexer, and the like. In addition, the RF circuit 410 may further communicate with the network and other devices via wireless communication.

The memory 420 may be configured to store a software program and a module, and the processor 480 executes various functional applications of the terminal device 400 and processes data by executing the software program and the module stored in the memory 420. The memory 420 may mainly include a storage program area and a storage data area, where the storage program area may store an operating system, at least one application required for a function (such as a sound playing function, an image playing function) and the like; the storage data area may store data (such as audio data, a phone book) created according to the use of the terminal device 400, and the like. In addition, the memory 420 may include a high-speed random access memory and may also include a non-volatile memory such as at least one disk storage device, flash memory device, or other volatile solid-state storage devices.

Other input devices 430 may be configured to receive input digital or character information and generate a signal input relating to user setting and functional control of the terminal device 400. Specifically, other input devices 430 may include, but are not limited to, one or more of a physical keyboard, a function key (such as a volume control button, a power button), a trackball, a mouse, a joystick, an optical mouse (the optical mouse is a touch-sensitive surface that does not display a visual output, or is an extension of a touch-sensitive surface formed by a touch screen), and the like. Other input devices 430 are connected to other input device controllers 471 of the I/O subsystem 470, and perform signal interaction with the processor 480 under the control of other input device controllers 471.

The display 440 may be configured to display information input by a user or information provided to the user and various menus of the terminal device 400, and may also accept a user input. Specifically, the display 440 may be a touch screen, and may include a display panel 441 and a touch panel 442. The touch panel 442 may cover the display panel 441, and the user may operate on or near the touch panel 442 covered by the display panel 441 according to content displayed on the display panel 441 (the displayed content includes but is not limited to a soft keyboard, a virtual mouse, a virtual button, an icon). After the touch panel 442 detects the operation on or near the touch panel 442, it is transmitted to the processor 480 through the I/O subsystem 470 to determine the user input, and then the processor 480 provides corresponding visual output on the display panel 441 through the I/O subsystem 470 according to the user input. Although in FIG. 4, the touch panel 442 and the display panel 441 are used as two independent components to implement an input function and an output function of the terminal device 400, however, in some embodiments, the touch panel 442 and the display panel 441 may be integrated to implement an input function and an output function of the terminal device 400.

The terminal device 400 may further include at least one sensor 450, for example, the sensor 450 may be a fingerprint identification sensor, that is, a fingerprint device in an embodiment of the present application.

The audio circuit 460, the speaker 461, and the microphone 462 may provide an audio interface between the user and the terminal device 400. The audio circuit 460 may transmit a received signal converted from audio data to the speaker 461, and the speaker 461 converts the signal into a sound signal for output. On the other hand, the microphone 462 converts the collected sound signal into a signal, and after receiving the signal, the audio circuit 460 converts the signal into audio data, and then outputs the audio data to the RF circuit 410, to transmit to, for example, another mobile phone, or outputs audio data to the memory 420 for further processing.

The I/O subsystem 470 is an external device configured to control input and output, and may include other input device controllers 471, a sensor controller 472, and a display controller 473. Optionally, one or more other input device controllers 471 receive a signal from other input devices 430 and/or transmit a signal to other input devices 430, and other input devices 430 may include a physical button (a push button, a rocker button), a dial, a slide switch, a joystick, a click roller, an optical mouse (the optical mouse is a touch-sensitive surface that does not display a visual output, or is an extension of the touch-sensitive surface formed by the display). It should be noted that other input device controllers 471 may be connected to any one or more of the foregoing devices. The display controller 473 in the I/O subsystem 470 receives a signal from the display 440 and/or transmits a signal to the display 440. After the display 440 detects the user input, the display controller 473 converts the detected user input into interaction with a user interface object displayed on the display 440, that is, human-computer interaction is achieved. The sensor controller 472 may receive a signal from one or more sensors 450 and/or transmit a signal to one or more sensors 450.

The processor 480 is a control center of the terminal device 400, which connects various parts of the entire terminal device using various interfaces and lines, and executes various functions of the terminal device 400 and processes the data by running or executing the software program and/or module stored in the memory 420 and by calling the data stored in the memory 420, thereby performing overall monitoring of the terminal device. Optionally, processor 480 may include one or more processing units; preferably, the processor 480 may integrate an application processor and a modem processor, where the application processor mainly processes an operating system, a user interface, an application, and the like; and the modem processor mainly processes wireless communication. It can be understood that the modem processor may not be integrated into the processor 480. The processor 480 may be used to execute various steps in the method embodiment of the present application. The processor 480 may include a CPU and an MCU of an operating system.

The terminal device 400 further includes a power supply 490 (such as a battery) for supplying power to various components. Preferably, the power supply may be logically connected to the processor 480 through a power management system, through which manages functions of charging, discharging, power consumption and the like.

Although not shown, the terminal device 400 may also include a camera, a Bluetooth module, and the like, which will not be repeatedly described herein.

It should be understood that the terminal device 400 may correspond to the terminal device in the power-on processing method according to the embodiment of the present application, and the terminal device 400 may include an entity unit for executing the method executed by the terminal device in the foregoing method. Moreover, each entity unit in the terminal device 400 and the other operations and/or functions described above are respectively for the corresponding flow of the foregoing method, which will not be repeatedly described herein for brevity.

Persons of ordinary skill in the art may be aware that various exemplary units and circuits described in conjunction with the embodiments disclosed herein can be implemented by electronic hardware or a combination of computer software and electronic hardware. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the present application.

It should be understood that, in the several embodiments provided in the present application, the disclosed circuits, branches, and units may be implemented in other manners. For example, the above-described branches are merely exemplary. For example, dividing of the units is merely a type of logical function dividing, and there may be other dividing manners during actual implementation. For example, multiple units or components may be combined or integrated into a branch, or some features may be ignored, or may not be executed.

If being implemented in the form of a software functional unit and sold or used as a separate product, the integrated unit may be stored in a computer-readable storage medium. Based on such understanding, the nature of the technical solutions of the present application, or the part contributing to the prior art, or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The preceding storage mediums includes various mediums that can store program codes, such as, a U disk, a removable hard disk, a read-only memory (ROM), a random access memory (RAM), a magnetic disk, an optical disk, or the like.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A power-on processing method of a terminal device, wherein the terminal device comprises a fingerprint device and a power button, the power button is configured to start an operating system of the terminal device, and the method comprises:
   detecting whether a fingerprint input operation is performed on the fingerprint device, when the operating system of the terminal device is in a non-working state;
   controlling the fingerprint device to collect fingerprint data corresponding to the fingerprint input operation when it is detected that the fingerprint input operation is performed on the fingerprint device;
   detecting whether the fingerprint input operation triggers the power button, when it is detected that the fingerprint input operation is performed on the fingerprint device; and
   transmitting the fingerprint data collected by the fingerprint device to the operating system for security verification, when it is detected that the fingerprint input operation triggers the power button;
   wherein the method further comprises:
   starting a first timer when the fingerprint device has collected the fingerprint data corresponding to the fingerprint input operation;
   detecting that a new fingerprint input operation is performed before the first timer expires; and
   controlling the fingerprint device to collect fingerprint data corresponding to the new fingerprint input operation;
   wherein the transmitting the fingerprint data collected by the fingerprint device to the operating system, when it is detected that the fingerprint input operation triggers the power button comprises:
   transmitting a latest fingerprint data collected by the fingerprint device to the operating system, when it is detected that the fingerprint input operation triggers the power button and the first timer expires,
   deleting the fingerprint data corresponding to the fingerprint input operation collected by the fingerprint device, when it is detected that the fingerprint input operation does not trigger the power button.

2. The method according to claim 1, wherein the detecting whether the fingerprint input operation triggers the power button, when it is detected that the fingerprint input operation is performed on the fingerprint device comprises:
   starting a second timer when the fingerprint device has collected the fingerprint data corresponding to the fingerprint input operation; and
   detecting an embedded controller (EC) power state of the terminal device, when the second timer expires; and
   wherein if the EC power state is a power-on state, the operating system has been started under the trigger of the fingerprint input operation; or
   if the EC power state is a power-down state, the operating system has not been started under the trigger of the fingerprint input operation.

3. The method according to claim 1, wherein the transmitting the fingerprint data collected by the fingerprint device to the operating system comprises:
   transmitting the fingerprint data collected by the fingerprint device to the operating system, when a fingerprint data verification request is received from the operating system.

4. The method according to claim 1, wherein an operating mode of the fingerprint device is a low power consumption detection mode, when the operating system is in the non-working state and it is not detected that the fingerprint input operation is performed on the fingerprint device; and/or
   a microcontroller unit (MCU) of the terminal device is in a sleep state, when the operating system is in the non-working state and it is not detected that the fingerprint input operation is performed on the fingerprint device.

5. The method according to claim 1, wherein the method further comprises:
   prompting a user to perform a fingerprint input operation again, when the operating system verifies the fingerprint data collected by the fingerprint device unsuccessfully.

6. The method according to claim 3, further comprising:
   starting a third timer when it is detected that the operating system has been started under the trigger of the fingerprint input operation; and
   deleting the fingerprint data corresponding to the fingerprint input operation collected by the fingerprint device, when the fingerprint data verification request is not received before the third timer expires.

7. The method according to claim 4, wherein before the detecting whether the fingerprint input operation is performed on the fingerprint device, the method further comprises:
   setting the fingerprint device in the low power consumption detection mode, when it is detected that an embedded controller (EC) power state is a power-down state, and/or
   setting the fingerprint device in the low power consumption detection mode according to a command issued by the operating system, when the operating system is about to enter the non-working state.

8. A power-on processing apparatus of a terminal device, wherein the terminal device comprises a fingerprint device and a power button, the power button is configured to start an operating system of the terminal device, and the apparatus comprises:
   a first detecting unit, configured to detect whether a fingerprint input operation is performed on the fingerprint device, when the operating system of the terminal device is in a non-working state;
   a first control unit, configured to control the fingerprint device to collect fingerprint data corresponding to the fingerprint input operation when the first detecting unit detects that the fingerprint input operation is performed on the fingerprint device;
   a second detecting unit, configured to detect whether the fingerprint input operation triggers the power button, when the first detecting unit detects that the fingerprint input operation is performed on the fingerprint device; and
   a transmitting unit, configured to transmit the fingerprint data collected by the fingerprint device to the operating system for security verification, when the second detecting unit detects that the fingerprint input operation triggers the power button;
   wherein the apparatus further comprises:
   a first timing unit, configured to start a first timer when the fingerprint device has collected the fingerprint data corresponding to the fingerprint input operation; and
   a first deleting unit, configured to delete the fingerprint data corresponding to the fingerprint input operation collected by the fingerprint device, when it is detected that the fingerprint input operation does not trigger the power button;

wherein the first detecting unit is further configured to:
detect that a new fingerprint input operation is performed before the first timer expires;
the first control unit is further configured to:
control the fingerprint device to collect fingerprint data corresponding to the new fingerprint input operation; and
the transmitting unit is configured to:
transmit a latest fingerprint data collected by the fingerprint device to the operating system, when the second detecting unit detects that the fingerprint input operation triggers the power button and the first timer expires.

9. The apparatus according to claim 8, wherein the second detecting unit is configured to:
start a second timer when the fingerprint device has collected the fingerprint data corresponding to the fingerprint input operation; and
detecting an embedded controller (EC) power state of the terminal device, when the second timer expires;
wherein if the EC power state is a power-on state, the operating system has been started under the trigger of the fingerprint input operation; or
if the EC power state is a power-down state, the operating system has not been started under the trigger of the fingerprint input operation.

10. The apparatus according to claim 8, wherein the transmitting unit is configured to:
transmit the fingerprint data corresponding to the fingerprint input operation collected by the fingerprint device to the operating system, when a fingerprint data verification request is received from the operating system.

11. The apparatus according to claim 8, wherein an operating mode of the fingerprint device is a low power consumption detection mode, when the operating system is in the non-working state and it is not detected that the fingerprint input operation is performed on the fingerprint device.

12. The apparatus according to claim 8, wherein a microcontroller unit (MCU) of the terminal device is in a sleep state, when the operating system is in the non-working state and it is not detected that the fingerprint input operation is performed on the fingerprint device.

13. The apparatus according to claim 8, further comprising:
a prompting unit, configured to prompt a user to perform a fingerprint input operation again, when the operating system verifies the fingerprint data collected by the fingerprint device unsuccessfully.

14. The apparatus according to claim 8, wherein the non-working state comprises a sleep state, a hibernation state or a shutdown state.

15. The apparatus according to claim 10, further comprising:
a second timing unit, configured to start a third timer when it is detected that the operating system has been started under the trigger of the fingerprint input operation; and
a second deleting unit, configured to delete the fingerprint data of the fingerprint input operation collected by the fingerprint device, when the fingerprint data verification request is not received before the third timer expires.

16. The apparatus according to claim 11, further comprising:
a configuration unit, configured to set the fingerprint device in the low power consumption detection mode, when it is detected that an embedded controller (EC) power state is a power-down state and before whether the fingerprint input operation is performed on the fingerprint device is detected; and/or configured to set the fingerprint device in the low power consumption detection mode according to a command issued by the operating system, when the operating system is about to enter the non-working state and before whether the fingerprint input operation is performed on the fingerprint device is detected.

17. A terminal device, wherein the terminal device comprises an apparatus, a fingerprint device, and a power button, wherein the apparatus comprising:
a first detecting unit, configured to detect whether a fingerprint input operation is performed on the fingerprint device, when the operating system of the terminal device is in a non-working state;
a first control unit, configured to control the fingerprint device to collect fingerprint data corresponding to the fingerprint input operation when the first detecting unit detects that the fingerprint input operation is performed on the fingerprint device;
a second detecting unit, configured to detect whether the fingerprint input operation triggers the power button, when the first detecting unit detects that the fingerprint input operation is performed on the fingerprint device; and
a transmitting unit, configured to transmit the fingerprint data collected by the fingerprint device to the operating system for security verification, when the second detecting unit detects that the fingerprint input operation triggers the power button;
wherein the apparatus further comprises:
a first timing unit, configured to start a first timer when the fingerprint device has collected the fingerprint data corresponding to the fingerprint input operation; and
a first deleting unit, configured to delete the fingerprint data corresponding to the fingerprint input operation collected by the fingerprint device, when it is detected that the fingerprint input operation does not trigger the power button;
wherein the first detecting unit is further configured to:
detect that a new fingerprint input operation is performed before the first timer expires;
the first control unit is further configured to:
control the fingerprint device to collect fingerprint data corresponding to the new fingerprint input operation; and
the transmitting unit is configured to:
transmit a latest fingerprint data collected by the fingerprint device to the operating system, when the second detecting unit detects that the fingerprint input operation triggers the power button and the first timer expires.

18. The terminal device according to claim 17, wherein the fingerprint device is mounted on the power button.

* * * * *